United States Patent [19]
Brown et al.

[11] Patent Number: 5,229,145
[45] Date of Patent: Jul. 20, 1993

[54] MULTI-LEVEL STACKED MOLD SYSTEM

[76] Inventors: David Brown, 52 Monte Vista Trail, Brampton, Ontario, L6Z 2G5; Harald Gaul, P.O. Box 1131, Barrie, Ontario, L4M 5E2; Yosif Kushnir, 755 Steeles Avenue, Apt. 1102, Willowdale, Ontario, M2R 2S6; Nick Travaglini, 51 Harris Crescent, Woodbridge, Ontario, L4L 1A8; Victor Wilson, 37 Lawndale Court, Bondhead, Ontario, L0G 1B0, all of Canada

[21] Appl. No.: 544,453

[22] Filed: Jun. 27, 1990

[51] Int. Cl.⁵ .................................................. B29C 45/23
[52] U.S. Cl. ........................................ 425/563; 425/564; 425/565; 425/572; 425/581; 425/588; 425/589
[58] Field of Search ............... 425/562, 563, 564, 565, 425/572, 574, 581, 588, 589, 595

[56] References Cited

U.S. PATENT DOCUMENTS

| | | | |
|---|---|---|---|
| 2,770,011 | 11/1956 | Kelly | 425/563 |
| 3,295,169 | 1/1967 | Moslo | 425/563 |
| 3,533,594 | 10/1970 | Segmuller | 425/568 |
| 3,540,524 | 11/1970 | Bachelier | 425/595 |
| 3,806,295 | 4/1974 | Gellert | 425/563 |
| 3,843,294 | 10/1974 | Bielfeldt et al. | 425/572 |
| 3,934,626 | 1/1976 | Hall | 425/563 |
| 4,207,051 | 6/1980 | Wright et al. | 425/556 |
| 4,212,626 | 7/1980 | Gellert | 425/562 |
| 4,309,163 | 1/1982 | Cottancin | 425/543 |
| 4,473,347 | 9/1984 | Terashima | 425/562 |
| 4,477,242 | 10/1984 | Eichlseder | 425/562 |
| 4,586,887 | 5/1986 | Gellert | 425/549 |
| 4,599,064 | 7/1986 | Landis et al. | 425/549 |
| 4,663,811 | 5/1987 | Gellert | 425/564 |
| 4,669,971 | 6/1987 | Gellert | 425/549 |
| 4,971,747 | 11/1990 | Sorensen | 425/562 |

Primary Examiner—Tim Heitbrink

[57] ABSTRACT

An injection mold for use with a molding press has four mold levels in axially stacked relation, permitting a substantial doubling of output for a given size of press as compared with a back-to-back two level stacked mold. The mold feeder flow path extends axially from the injector head to a flow distribution block located at the center of the stacked mold block series. The centrally located distribution block is connected, in use isolation, sealed relation with the injector head, being axially displaceable therefrom in continuing sealed relation upon the opening of the mold. A drool prevention valve system, located at two of the mold interfaces, to preclude drooling of fluid plastic stock upon opening of the molds includes pressure fluid actuators for operating the valves, wherein the pressure fluid may comprise the fluid plastic stock. The valve system also includes a depressurizing valve provision, wherein, upon opening of the mold interfaces the stock distribution passages are substantially depressurized, to thereby reduce any tendency to drool. The mold includes axial adjustment means to compensate for differential variations in overall mold length within the press, due to changes in effective mold temperature.

21 Claims, 3 Drawing Sheets

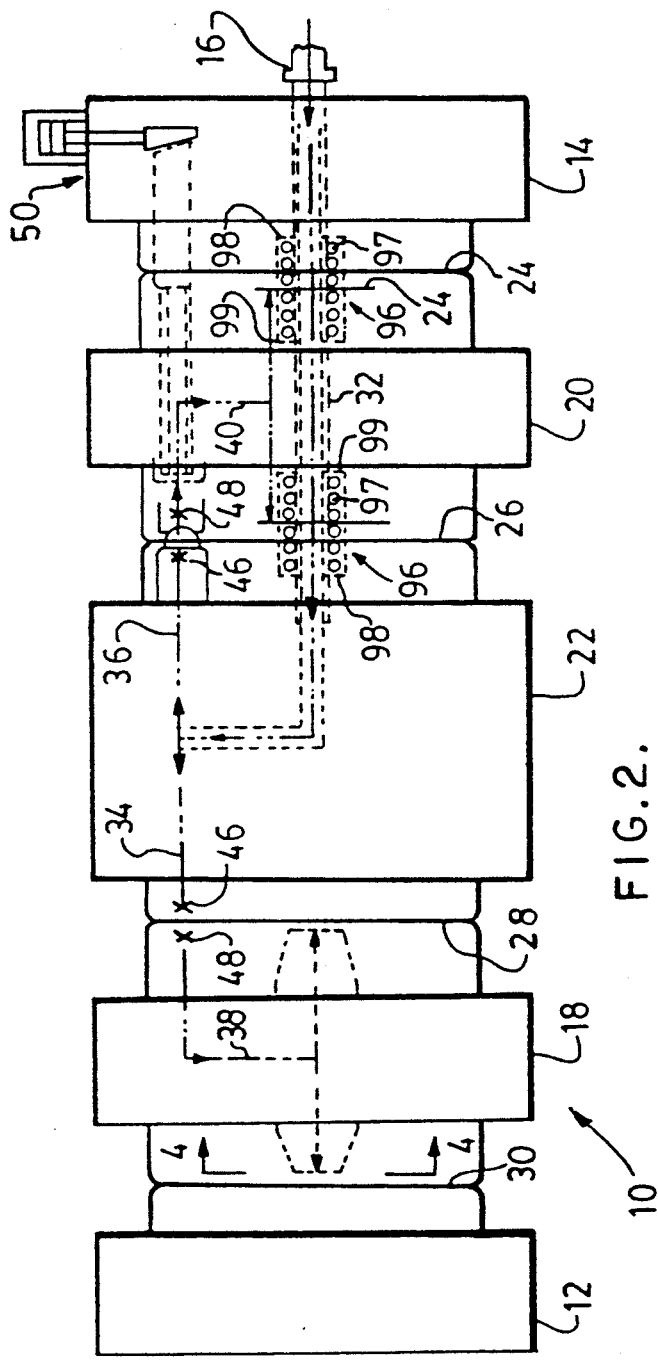
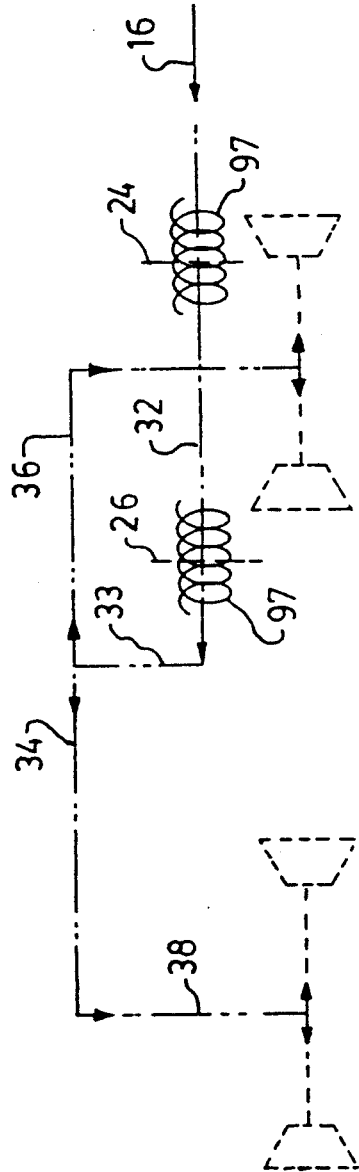
FIG. 2.
FIG. 3.

MULTI-LEVEL STACKED MOLD SYSTEM

TECHNICAL FIELD

This invention is directed to a plastic mold system, and in particular, to a multi-stack mold system

BACKGROUND ART

The use of cavity die molds has progressed from the use of single cavity dies, through multi-cavity dies, to the use of 2-level stacked mold arrangements. In such arrangements, the available axial compressive force provided by the molding press is utilized in a pair of molds arranged in back-to-back relation, so as to effectively double the productive capacity of the machine for substantially the same press loading. Such an arrangement gives a doubled production rate with little increase in the axial loading required of the press.

The production levels that are presently achievable are limited to 2-level stack molding i.e. the number of articles per injection cycle is limited to the total contents of each of two levels, being generally twice the number of cavities per single mold face or level.

The effective working of such arrangements, depends among other things, on the provision of balanced feeder flow paths to all of the die cavities.

The mold stack is subject to differential expansion, axially, between different groups of parts thereof, namely the hot runner system and the mold body.

Various aspects of the prior art relating to injection molding, including die construction for stock flow symmetry; inflow feed nozzles; valve gate actuation; melt or feed transfer, including mold block to mold block stock transfer; drool prevention; mold stack construction; and block heater provisions may be found in the following U.S. patents, cited as being but illustrative of the prior art:

2,770,001 November 1956, Vely; 3,533,594 October 1970, Segmuler; 3,806,295 April 1974, Gellert; 3,843,294 October 1974, Bielfeldt et al.; 4,207,051 June 1980, Wright et al.; 4,212,626, July 1980, Gellert; 4,309,163 January 1982, Cottancin; 4,473,347 September 1984, Terashima; 4,477,242 October 1984, Eichlseder et al.; 4,586,887 May 1986, Gellert; 4,599,064 July 1986, Landis et al.; 4,663,811 May 1987, Gellert; 4,559,971 June 1987, Gellert.

DISCLOSURE OF THE INVENTION

In accordance with the present invention there is provided a stacked injection mold system suitable for use with a plurality of four or more mold blocks in mutually stacked relation.

In a mold system embodiment according to the present invention having a stacked injection mold containing at least four levels of mold cavities in a plurality of mold blocks, stock feed distribution means including a feed block located intermediately of the mold blocks to receive fluent feed stock from a stock injection head, and stock passage means connecting the feed block with the injection head and the mold blocks, in use to transfer stock to the mold cavities from the injection head; and isolating means to isolate the feed block from feed transfer relation with the mold blocks and the injection head.

The separable mold and feed blocks form a plurality of block interfaces between each other; stock distribution passage means in the blocks span the interfaces thereof when the mold is in a closed condition, the mold blocks being in flow connecting relation with the feed block to form stock flowpaths therewith, and drool prevention valves located at the interfaces to substantially preclude drooling of the plastic stock from the flowpaths at the interfaces, upon opening of the interfaces.

The drool prevention valves are preferably located on each side of, and axially adjoining the respective block interfaces.

In the preferred embodiment the valves are pressure fluid actuated.

In one embodiment the preferred actuating fluid comprises the plastic fluid stock, wherein the valves are actuated, at least in part, in response to changes in the pressure of the stock.

In one embodiment stock depressurization valve means are provided in association with the stock flow path, being operable in response to force generating means within the mold, to reduce stock pressure within the stock flow path.

The stock depressurization valve force generating means may have pressure responsive actuator means to drive the valve in pressure modifying relation with the flow path.

The pressure responsive actuator means may include a fluid actuated piston having return spring means whereby upon reduction in pressure of the fluid acting upon the piston the return spring means become effective to displace the piston, thereby actuating the valve in a local stock depressurizing action.

In an arrangement having a spring driven piston connected in closing relation with a valve stem, and having a valve head portion movable axially into sealing relation with a valve seat, the valve seat may itself be axially movable along the axis of the valve stem, in use to permit axial displacement of the valve head portion and the valve seat in mutual sealing engagement, while effecting a local change in volume to the stock flow path.

Thus, one embodiment of the invention may comprise a drool prevention valve for use in a molding apparatus, the valve having a seat portion located within a passageway for the passage of fluid therepast, a valve stem connected in controlling relation with a valve head; the head being displaceable axially by the stem into sealing engagement with the seat portion, and guide passage means receiving the seat portion in axially displaceable relation therein, to permit displacement of the head and the seat in mutually engaged sealing relation along the guide passage means, whereby the passageway has the volume thereof effectively increased, in use to diminish the pressure of fluid contained therein. The drool prevention valve may have axial loading means connected with the valve stem, in displacement controlling relation.

The valve head of the drool prevention valve, located in one of the mold blocks, has an axially outer end face seat; a flow passage abuttment means extending from the adjacent block connects with the valve end face seat in separable, sealing relation therewith, the abuttment means being moved axially into sealing relation with the valve end face seat on closing of the mold.

The stacked injection mold in accordance with the invention may be provided with axial adjustment means for compensating for differential thermal expansion effects related to the effective axial lengths of certain of the mold components when in a closed condition.

In the preferred embodiment the axial adjustment means has moveable abuttment means thereof in axial, length compensating relation with stock feed components of the mold; and length compensating means to adjust the effective axial position of the abuttment means whereby changes in the forces acting upon the stock feed components due to thermal variations between respective mold components may be effectively compensated.

The mold axial adjustment means may include ramp means having an inclined surface movable in wedging relation with an abuttment surface of the mold, the angle of inclination of the inclined ramp surface being less than the angle of friction, in use to preclude overhauling between the inclined surface and the abuttment surface, on the application of press closure forces thereagainst during operation of the mold.

In the preferred embodiment ramp positioning means are provided for repositioning the ramp means relative to the abuttment surface, to permit selective adjustment of closure forces acting against stock flow path portions of the mold when in a closed condition thereof.

A contamination barrier may be provided about the primary stock flow path. This flow path extends through that mold block which is positioned in the mold stack at the location closest to the injection head, to convey heated stock from the injection head, through the mold block to the distribution block. When the specified mold block is opened, upon the completion of a molding cycle, for the ejection of the molded product, the provision of a contamination barrier about the stock feeder prevents contact of ejected product with the hot outer surface of the stock feeder. In a preferred embodiment the contamination barrier may comprise a low force coil spring surrounding the exposed axial length of the stock feeder, in radially spaced relation therefrom. The coil spring barrier stabilizes thermally at a temperature well below that of the stock flow path, and serves to deflect any molded product falling against the barrier, to preclude contact and sticking of the product to the feeder, and to prevent accidental contact of an operators hands with the high temperature surface of the stock feeder.

When the mold stack closes, the coils of the barrier spring compress, to occupy recesses in the respective block faces, surrounding the stock feeder.

In operation, upon opening of the mold, the operation of the anti-drool valves and the axial separation of the mold blocks from the distribution block serves to isolate the distribution block. However in some circumstances it may be found that the system can be operated without the occurrence of drooling upon opening of the mold, without the operation of the anti-drool valves.

BRIEF DESCRIPTION OF THE DRAWINGS

Certain embodiments of the invention are described by way of illustration, without limitation of the invention thereto, reference being made to the accompanying drawings, wherein:

FIG. 2 is a schematic plan view of the stacked mold of FIG. 1;

FIG. 3 is a schematic arrangement showing the stock distribution flow path of FIGS. 1 and 2;

BEST MODE OF CARRYING OUT THE INVENTION

Figure 1:
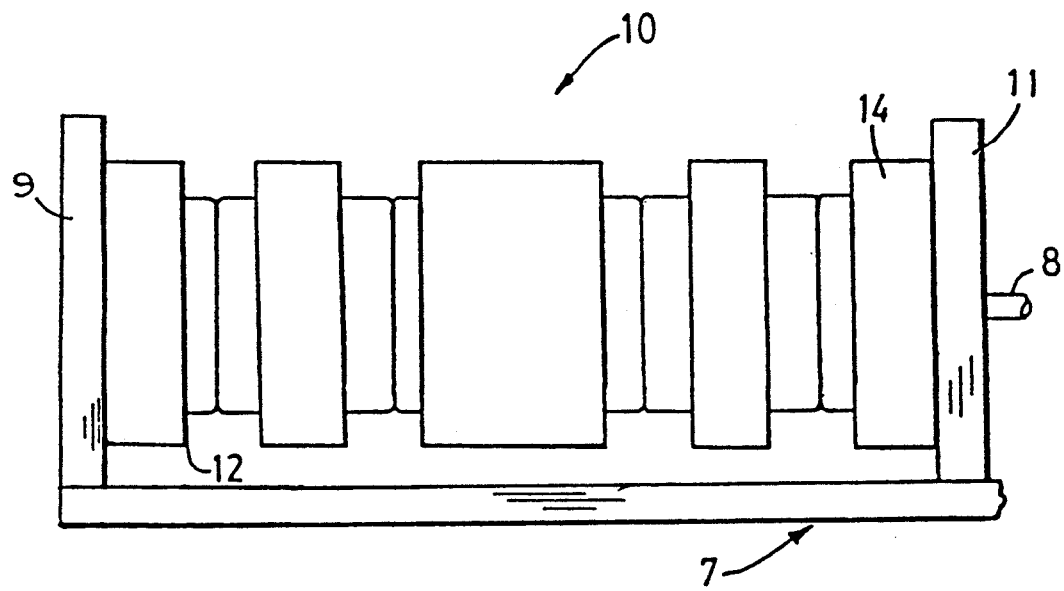
FIG. 1 is a schematic side elevation of a portion of an injection molding press having a stacked mold in accordance with the present invention mounted therein.

Referring to FIGS. 1 and 2, an injection press 7 for molding thermoplastic elastomers has an injection head 8 with a movable platen 9 and a stationary platen 11, between which is mounted a mold 10, in accordance with the present invention.

The mold system 10 comprises a 4-layer stacked mold, sized to fit within a standard press, bearing against the mold pressure heads 12 and 14. A stock feeder connection 16 connects with the injector head 8 of press 7.

First and second back-to-back mold blocks 18, 20 are located respectively on opposite sides of a centrally located feed distributor block 22.

The distributor block 22 is dynamically mobile, in that it is connected by way of the feeder 32 and feeder connection 16 with the press injection head 8, and also with the secondary feeders 38, 40 when in the mold-closed condition. Upon opening of the mold the distributor block 22 becomes separated from the injection head 8 and also from the mold secondary feeders 38, 40.

The mold system 10, shown in its closed, operative molding condition, upon completion of the stock injection phase expands axially, by separation between head 8 and platen 9, on opening of the press.

The head 8 being fixed, the mold head 14 also remains stationary, and mold stack components 20, 18, and 12, together with the feed distributor block 22 are moved progressively leftwardly, as illustrated, so that the respective four mold interfaces 24, 26, 28 and 30 each opens equally, to an axial extent necessary to permit clear ejection of the molded components from their respective mold die cavities, while also providing total isolation of the feed block.

Synchronized axial displacement of the stacked mold components 12, 18, 20 and 22 in relation to the stationary platen 11 and pressure head 14 occurs on axially extending arbor bars (not shown).

Referring to FIGS. 2 and 3, the stock primary feeder 32 is of fixed length, and is located on the main or polar axis of mold 10.

The primary feeder 32 is secured to the centrally located distributor block 22, being attached at 16 to the stock feed pressure head 8 when the mold is closed, and separating therefrom when the mold 10 is opened. The feeder 32 extends in radially separated relation through mold block 20. Upon opening of the mold 10 axial separation of the mold components takes place, thereby exposing portions of the stock primary feeder 32 outside the associated mold block component parts. At this time extensible contamination barrier springs 96, detailed below, come into play to isolate the feeder 32.

Branch feed connections 34, 36 in distributor block 22 connect respectively axially forwardly and rearwardly to respective mold feeders 38, 40 located in the respective mold blocks 18, 20.

Figure 4:
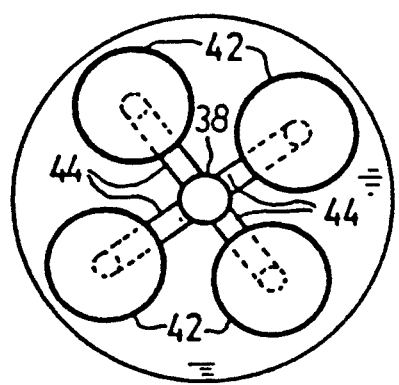
FIG. 4 is a section taken at 4—4 of FIG. 2, showing one possible mold die arrangement; and, FIG. 5 is an enlarged detail, in diametrical section, of a portion of the FIG. 2 arrangement.

The feeders 38, 40 in turn each branch axially forwardly and rearwardly within mold blocks 18, 20 to feed the respective multiple die cavities 42 within each of the mold blocks. It will be understood that the quadruple die arrangement of FIG. 4 is purely illustrative, and is not limiting hereon.

Each double mold 18, 20 has a respective pair of interfaces 28, 30; 24 and 26, where the respective molds open, i.e. they "split".

At the mold interfaces 26, 28 there are located antidrool valve arrangements, comprising a pressure responsive valve 46 located on the "upstream" side of each stock secondary feeder, at the interface; and a remotely actuated valve 48 at the downstream side of interfaces 26, 28.

Figure 5:
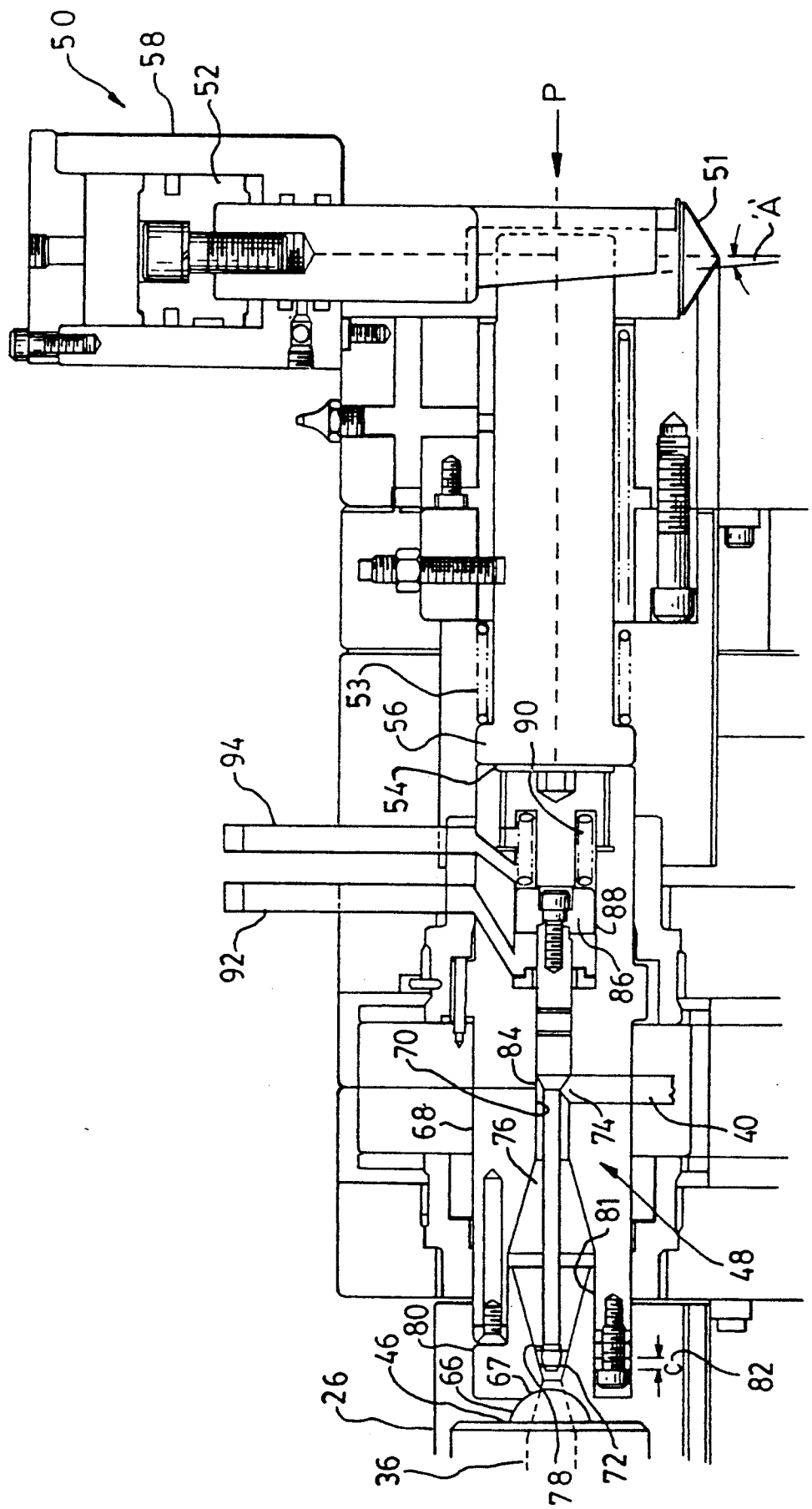

The valve 48 is indicated schematically at interface 26 of FIG. 2, and shown in detail in FIG. 5.

FIG. 5 also shows in more particulars an adjustable mold lock-up loading system 50 having a transversely driven wedge 51, positioned by piston 52 in axial loading relation by way of an axial thrust bar 56 acting against the end face 54 of the body of valve 48.

In operation the wedge 51 is precisely positioned laterally by a double acting hydraulic actuator 58, such that on closure of the press 7 a predetermined closure force is applied to compensate for the effects of differential thermal expansion in the system. The axial force generated on closure of the press 7, as modified by loading system 50, is applied at block interfaces 26, 28, to ensure an absence of stock drool or spurt when injection pressure is applied. The transverse location of wedge 51, by actuator 48, determines the extent of differential displacement of the plastic feeder system flowpaths relative to the mold 10, on closure of the press 7, in order to maintain effective loading at the valve interfaces 26, 28 to prevent spurt or leakage in the stock secondary distributors.

Referring to FIG. 5, the branch feed connection 36 terminates in a pressure responsive cut off valve 46 at the interface 26. The valve 46 is a well known commercial type, of which a number of different makes are normally used for stock flow control at the injector interface.

The radiused seal face 66 of valve 46 connects in stock sealing relation with seal face 67 of the valve 48, which controls stock flow to the mold feeder 40.

The valve 48 has a body 68 with stock flow passage 70 therethrough, extending between an upstream seat 72 and lateral port 74, connecting to the feeder 40.

An elongated valve spindle 76 has a tapered valve head 78, to sealingly engage the seat 72.

The valve seat 72 is mounted in an axially slidable nose portion 80 slidably mounted in a guide passage 81, and secured to valve body 68 to permit displacement in an upstream direction by a distance C, indicated at 82.

The valve spindle 76 includes a conical piston face 84, and has a control piston 86 located within cylinder 88.

A coiled compression spring 90 abuts the downstream end face of control piston 86. Pressure fluid connections 92, 94, which may be pneumatic or hydraulic, connect with the respective upstream and downstream ends of cylinder 88.

Fluid pressure, pneumatic or hydraulic, may be used by way of the connections 92, 94 to supplement or as a substitute for the spring 90.

In operation, with the press 7 in a closed condition, such that interface 26 is tightly closed, the radiused end face 66 of valve 46 is held in sealing relation with the nose portion 80, forcing the nose portion 80 axially rightwardly, as viewed in the drawings, in a downstream direction to abut its housing, so as to compress the spring 90 and take-up the clearance C, at 82.

Upon actuation of the press injector (not shown), to admit fluid stock to the feeder 32, the injection pressure at 36 serves to open the valves 46 and 48, admitting the stock by way of the feeder 40 to the respective mold cavities.

Termination of injection pressure by the press injector reduces stock pressure within the mold 10, so that valves 46 and 48 can both close.

As the press 7 opens, withdrawing end face 66 from nose portion 80, the spring 90 drives the piston 86 leftwardly, to displace valve spindle 76, along with the valve head 78 seated in sealing relation on seat 72, leftwardly in the upstream direction. The nose portion 80 slides axially upstream, taking up the clearance C. This displacement increases the internal flow passage volume adjoining nose portion 80, within mold block 20, effectively diminishing the internal pressure acting on the fluid feed stock. As the press continues to open, stock flow in the thus depressurized distributors 18, 20 terminates, and no drooling occurs, either into the mold cavities or between the mold interfaces as the dies eject the molded components.

Closure of the press reverses the travel action of valve 48, and commencement of a further injection cycle can proceed.

Owing to the generally higher temperature of the injected stock, relative to the mold system, the temperature of the stock feed path rises, in relation to the mold, which in turn gives rise to differential thermal expansion of the feed stock distribution means, relative to the mold blocks and the feed block.

Referring to the loading adjustment system 50, axial closure forces applied by the press 7 are transmitted axially against wedge 51 to thrust members 56, 54, thus determining the axial sealing force and corresponding reaction force exerted at the respective seal faces 66, 67 of the valves 46 and 48. A spring 53 maintains thrust members 56, 54 in a forward, lightly pre-loaded condition.

Prior to closure of the press 7 at start-up the piston 52 of the load adjustment system 50 may be adjusted radially, in accordance with changes in the steady state temperature of the mold stack 10 and the feed stock distribution means. The piston 52 is adjusted radially, so as to allow for the differential axial growth which develops between the stock feed distribution means and the component parts of the mold stack.

Thus, as the temperature of the flow distributor channels initially increases rapidly relative to the mold stack 10, the wedge portion 51 is backed off, to maintain a substantially constant closure force at the valve faces 66, 67 of the feed stock distribution means. As the temperature of mold stack rises, to reach a steady state, the wedge 51 may be readjusted, to maintain a consistent range of closure force.

The adjustment provided by the load adjustment system 50 can thus ensure that sufficient closing force is applied at the respective valve interfaces to preclude spurting of liquid stock feed, under pressure into the interspaces of the mold during the production cycles.

The angle A of the wedge portion 51 is selected to be less than the angle of friction of the associated contact faces, so that the application of the thermal expansion load, P, cannot produce overhauling displacement forces acting along the wedge 51.

It is contemplated that a load cell may be incorporated in the line of action of wedge 51, such as in association with thrust member 56, to provide an output connected in controlling relation with the actuator 58. Such actuation, generally, would be corrective in nature, so that positioning of wedge 51 would be corrected at the time of opening of the press 7, in order to maintain loads applied by the wedge to the thrust member 56 and associated feed distributor components within predetermined safe operational limits for succeeding injection cycles.

Referring to FIGS. 2 and 3, contamination barriers 96 comprising multicoil springs 97 contained within recesses 98, 99, serve to protect the stock feeder 32 against contamination by molded product falling thereagainst and adhering thereto, when the mold stack is opened. The springs 97 also serve an important safety function, to prevent accidental contact by the mold operator with the hot outer surfaces of primary feeder 32 which otherwise would be exposed upon opening of the press 7 and mold 10.

INDUSTRIAL APPLICABILITY

This stacked mold system, is particularly suited to plastics molding industry, for the repetitive mass production of plastic articles by injection molding.

We claim:

1. A mold apparatus having a stacked injection mold containing at least four levels of mold cavities in a plurality of mold blocks, symmetrical flow path stock feed distribution means including a feed block located intermediately and centrally of said mold blocks to receive fluent feed stock from a stock injection head, first stock supply passage means connecting said feed block with said injection head and second stock supply passage means comprising a pair of mutually oppositely directed stock flow passages, of substantially equal length connecting said feed block with said mold blocks, in use to substantially simultaneously transfer stock to each of said at least four levels of mold cavities from said injection head for simultaneous injection of said mold cavities;

and isolating valve means to isolate said feed block from feed transfer relation with said mold blocks and said injection head.

2. The apparatus as set forth in claim 1, said isolating means being responsive to termination of an injection cycle to isolate said feed block.

3. The apparatus as set forth in claim 1, said feed block being totally isolated from said injection head and said mold blocks by physical separation therefrom upon opening of said apparatus.

4. The apparatus as set forth in claim 1, said mold blocks and said feed block being stacked in mutual, axially separable relation, said second stock supply, passage means including separable feed interfaces for each said block;

and drool prevention valve means at said interfaces, to preclude drooling of said stock on opening of said interfaces.

5. The apparatus as set forth in claim 4, each said separable interface having said drool prevention valve means in mutual back-to-back relation on opposite sides of each interface.

6. The apparatus as set forth in claim 4, wherein said valve means are fluid actuated.

7. The apparatus as set forth in claim 6 wherein said fluid actuated valve means are actuated by said liquid feed stock, in response to changes in pressure thereof.

8. The apparatus as set forth in claim 6, including stock depressurization valve means located in said second stock supply passage means, being operable in response to force generating means within said mold to reduce stock pressure within said second stock supply passage means.

9. The apparatus as set forth in claim 8, said depressurization valve means having pressure responsive actuator means to drive said depressurization valve means in pressure modifying relation with said second stock supply passage means.

10. The apparatus as set forth in claim 9, said pressure responsive actuator means including a fluid actuated piston having return spring means, whereby, upon reduction of pressure acting on said piston said return spring means becomes effective to displace said piston.

11. The apparatus as set forth in claim 10, said fluid actuated piston connecting in closing relation with a valve stem, said valve stem having a head portion in sealing relation with a valve seat; said valve seat being movable axially along the axis of said valve stem, in use to permit axial displacement of said valve head portion and said valve seat while maintaining said valve head portion and said valve seat in mutual sealing engagement.

12. The apparatus as set forth in claim 4, portions of said second stock supply passage means being located within said blocks when said mold is in a closed condition, and being exposed when said mold is in an open condition, with said blocks in separated relation and said mold cavities open for ejection of molded product therefrom, the apparatus including coiled spring means axially coextensive with and radially outwardly spaced from said second stock supply passage means, to provide, in use, a thermal gradient therebetween whereby the spring means are at a lower temperature than the second stock supply passage means, to serve as a barrier to molded components ejected from the mold cavities and prevent contact and adhesion thereof to the second stock supply passage means.

13. A drool prevention valve for use in a molding apparatus, said valve having a body portion and a nose portion extending from said body portion, said nose portion being movable relative to said body portion; said nose portion having a first, external annular seat and a second, internal annular seat, each seat forming a part of a stock flow path, said stock flow path extending internally of said valve from said second seat to an external feeder line connection; movement of said nose portion relative to said body portion producing a corresponding change in the volume of said stock flow path; valve head means within said body portion engageable in sealing relation with said second seat, and valve head control means, including a valve stem connecting with said valve head, to enable movement of said nose portion relative to said body portion while maintaining said valve head in sealing relation with said second seat, whereby said first seat may be displaced, relative to said valve body portion, to change said volume of said stock flow path while maintaining said second seat in a closed and sealed condition.

14. A mold apparatus having a stacked injection mold containing at least four levels of mold cavities in a plurality of mold blocks, stock feed distribution means including a feed block located intermediately of said mold blocks to receive fluent feed stock from a stock injection head, said mold blocks and said feed block being stacked in mutual, axially separable relation, and stock supply passage means connecting said feed block with said injection head and said mold blocks, including separable feed interfaces for each said block; drool prevention valve means at said interfaces, to preclude drooling of said stock on opening of said interfaces, in use to transfer stock to said mold cavities from said injection head;

and isolating means to isolate said feed block from feed transfer relation with said mold blocks and said injection head;

portions of said stock supply passage means being located within said blocks when said mold is in a closed condition, and being exposed when said mold is in an open condition, with said blocks in separated relation and said mold cavities open for ejection of molded product therefrom, the apparatus including coiled spring means axially coextensive with and radially outwardly spaced from said stock passage means, to provide, in use, a thermal gradient therebetween whereby the spring means are at a lower temperature than the stock passage means, to serve as a barrier to molded components ejected from the mold cavities and prevent contact and adhesion thereof to the stock passage means.

15. A drool prevention valve for use in a molding apparatus, said valve having a seat portion located within a passageway for the passage of fluid through said seat portion, a valve stem connected in controlling relation with a valve head said valve stem having axial loading means for applying force to said valve stem in displacement controlling relation therewith;

said valve head being displaceable axially by said stem into sealing engagement with said seat portion; and guide passage means receiving said seat portion in axially displaceable relation therein, to permit displacement of said head and said seat in mutually engaged sealing relation along said guide passage means, whereby said passageway has the volume thereof effectively increased, in use to diminish the pressure of fluid contained therein.

16. A drool prevention valve for use in a molding apparatus, said valve having a seat portion located within a passageway for the passage of fluid through said seat portion, a valve steam connected in controlling relation with a valve head, loading means for applying axial force to said valve stem in displacement controlling relation therewith;

said valve head having an axially outer valve end face, flow passage abutment means connecting with said valve end face, in sealing relation therewith, and movable axially in sealing relation with said valve end face, said valve head being displaceable axially by said valve stem into sealing engagement with said seat portion;

guide passage means receiving said seat portion in axially displaceable relation therein, to permit displacement of said head and said seat in mutually engaged sealing relation along said guide passage means, whereby said passageway has the volume thereof effectively increased, in use to diminish the pressure of fluid contained therein.

17. A mold apparatus having a stacked injection mold containing at least four levels of mold cavities in a plurality of mold blocks, symmetrical flow path stock feed distribution means including a feed block located intermediately and centrally of said mold blocks to receive fluent feed stock from a stock injection head, first stock supply passage means connecting said feed block with said injection head and second stock supply passage means comprising a pair of mutually oppositely directed stock flow passages, of substantially equal length connecting said feed block with said mold blocks, in use to substantially simultaneously transfer stock to each of said mold cavities from said injection head;

isolating valve means to isolate said feed block from feed transfer relation with said mold blocks and said injection head;

said second stock supply passage means including a plurality of feed distribution axial segments axially expansible relative to respective ones of said blocks, the apparatus including axial loading means for selectively comprisively loading adjoining ones of said feed distribution axial segments together, in use to maintain sealing contact therebetween upon the application of injection pressure from stock injection head to the apparatus.

18. The apparatus as set forth in claim 17, said axial loading means having abutment means in axial length compensating relation with said stock passage axial segments, and adjustment means for selectively varying the axial position of said abutment means in axial load modifying relation with said axial segments.

19. The apparatus as set forth in claim 18, wherein said adjustment means includes ramp means having an inclined surface moveable in wedging relation with said abutment means, the angle of inclination of said inclined surface in use precluding overhauling of said abutment means on the application of thermal expansion forces thereagainst during operation of the mold.

20. The apparatus as set forth in claim 19, including positioning means connected in controlling relation with said ramp means, to selectively control the application of axial forces acting on the mold stock passage segments.

21. The apparatus as set forth in claim 20, said positioning means comprising a double acting fluid cylinder and piston combination.

* * * * *